US012803189B2

(12) United States Patent
Hegenauer et al.

(10) Patent No.: US 12,803,189 B2
(45) Date of Patent: Nov. 17, 2026

(54) CONNECTION ARRANGEMENT, CONNECTION SYSTEM AND METHOD FOR CONNECTING TWO ELECTRICAL CONDUCTORS

(71) Applicant: Rosenberger Hochfrequenztechnik Gmbh & Co. KG, Fridolfing (DE)

(72) Inventors: Johannes Hegenauer, Bergen (DE); Stefan Keiner, Inzell (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 366 days.

(21) Appl. No.: 18/419,951

(22) Filed: Jan. 23, 2024

(65) Prior Publication Data

US 2024/0313434 A1 Sep. 19, 2024

(30) Foreign Application Priority Data

Jan. 27, 2023 (EP) .................................... 23153774

(51) Int. Cl.
*H01R 4/30* (2006.01)
*H01R 4/34* (2006.01)

(52) U.S. Cl.
CPC ............... *H01R 4/302* (2013.01); *H01R 4/34* (2013.01)

(58) Field of Classification Search
None
See application file for complete search history.

(56) References Cited

U.S. PATENT DOCUMENTS 1,096,070 A * 5/1914 Stull .................... B65D 51/007 411/929
6,125,526 A * 10/2000 Wierzchon ............ F16B 5/0275 411/335
2002/0176739 A1* 11/2002 Goto ..................... F16B 5/0233 403/301
2019/0061994 A1 2/2019 Wagner
2021/0408721 A1 12/2021 Wolf

FOREIGN PATENT DOCUMENTS

EP 3664225 A1 6/2020
JP 2022097428 A 6/2022

OTHER PUBLICATIONS

Office Action issued by the European Patent Office dated Jan. 5, 2026.
European Search Report dated Jun. 27, 2023.

* cited by examiner

*Primary Examiner* — Ross N Gushi
(74) *Attorney, Agent, or Firm* — Randall Danskin P.S.

(57) ABSTRACT

A connection arrangement (4) for connecting a first electrical conductor (2) to a second electrical conductor (3) comprises a first fastening element (6) that is inserted into an aperture (9*a*) defined in the first electrical conductor (2) and which is supported on a side of the first electrical conductor (2) facing away from the second electrical conductor (3), and a second fastening element (7) which is supported on a side of the second electrical conductor (3) facing away from the first electrical conductor (2). The first fastening element (6) and the second fastening element (7) form a common primary threaded connection (18) to frictionally and electrically connect the first electrical conductor (2) to the second electrical conductor (3) in a screwed-together state. The first fastening element (6) further has a mechanical connection interface (13) for a captive connection to the first electrical conductor (2).

7 Claims, 3 Drawing Sheets

CONNECTION ARRANGEMENT, CONNECTION SYSTEM AND METHOD FOR CONNECTING TWO ELECTRICAL CONDUCTORS

CROSS-REFERENCE TO RELATED APPLICATIONS

This US National Stage Non-Provisional Patent Application claims priority to earlier filed European Patent Application No. 23 153 774.7 which was filed on 27 Jan. 2023. The entire contents of the aforementioned earlier filed European Patent Application is expressly and fully incorporated herein by this reference.

Pursuant to USPTO rules, this priority claim to earlier filed European Patent Application No. 23 153 774.7 which was filed on 27 Jan. 2023 is also included in the Application Data Sheet (ADS) filed herewith.

FIELD OF INVENTION

The invention relates to a connection arrangement for connecting a first electrical conductor to a second electrical conductor, said connection arrangement comprising a first fastening element and a second fastening element, wherein the first fastening element and the second fastening element form a common primary threaded connection in order to connect the first electrical conductor frictionally and electrically to the second electrical conductor in a screwed-together state, according to the preamble of claim 1.

The invention also relates to a connection system, in particular a connection system for high-voltage technology, comprising a connection arrangement and two electrical conductors.

The invention also relates to a method for connecting a first electrical conductor to a second electrical conductor.

BACKGROUND OF THE INVENTION

The provision of a safe and durable and robust electrical connection between current-carrying electrical conductors is particularly important in high-voltage technology. High-voltage connections are used, for example, in the automotive sector, especially in electric and/or hybrid vehicles, to supply a vehicle battery with charging current, to extract the stored energy from the battery and supply it to the electric drive, or to electrically connect a plurality of battery modules to each other. These electrical connections must guarantee the permanent transmission of high currents with preferably low transfer impedance.

Contact elements and busbars are often made of copper or aluminum. Due to the comparatively high fatigue phenomena (relaxation) of these materials, a mechanically stable, permanently safe electrical and mechanical connection cannot usually be established via a direct screw connection between the two electrical conductors.

Although directly pressing electrical conductors together may lead to a mechanically more stable connection, damage (e.g. microcracks) to the contact surfaces of the electrical conductors cannot always be ruled out, which may result in increased contact resistance between the electrical conductors. A press fit, for example, is therefore often avoided in high-voltage technology.

Mechanical frictional connections between two electrical conductors are also known (for example between two busbars), in which the electrical conductors are pressed against one another using screw and clamping elements. However, this requires many individual components, which increases the assembly effort, manufacturing costs and susceptibility to errors during assembly.

In view of the known prior art, the object of the present invention is to provide a connection arrangement by means of which two electrical conductors can be permanently and safely frictionally connected to one another with little assembly effort and preferably low contact resistance.

A further object of the present invention is to provide a connection system in which two electrical conductors with preferably low contact resistance are permanently and safely connected to each other frictionally, in particular with low assembly effort.

It is also an object of the invention to provide a method for the permanent and safe connection of two electrical conductors, in particular with low assembly effort and preferably low contact resistance.

A connection arrangement is provided for connecting a first electrical conductor to a second electrical conductor. The first electrical conductor and the second electrical conductor are hereinafter also referred to collectively as "the electrical conductors" or "the two electrical conductors". The electrical conductors are preferably not to be understood as components of the connection arrangement.

The electrical conductors are preferably electrical conductors that are suitable for carrying high electrical currents from the high-voltage range (e.g. for an electrical current of up to 100 amperes, up to 200 amperes, up to 300 amperes, up to 400 amperes, up to 500 amperes, up to 600 amperes, up to 2,000 amperes or more), preferably at high electrical voltages (e.g. up to 500 volts, up to 600 volts, up to 700 volts, up to 800 volts, up to 900 volts, up to 1,000 volts, up to 1,100 volts, up to 1,500 volts, up to 2,000 volts or more). The connection arrangement is therefore advantageously suitable for use in vehicle technology, for example, particularly preferably in the field of electromobility.

The conductor cross-section of the electrical conductors can, for example, be up to 10 $mm^2$, preferably up to 30 $mm^2$, particularly preferably up to 60 $mm^2$, even more preferably up to 90 $mm^2$, for example also up to 200 $mm^2$ or more. In particular, a conductor cross-section can be provided that is suitable for electrical energy transmission in high-voltage technology, i.e. for transmitting high electrical currents (for example 100 amperes up to 2,000 amperes) at alternating voltages of 30 volts to 1,000 volts or more, or direct voltages of 60 volts to 2,000 volts or more, especially in vehicle technology.

The electrical conductors may be electrical conductors of the same design, but may also be electrical conductors of different designs.

The first electrical conductor and/or the second electrical conductor may in particular be an electrical contact element, such as a busbar, a contact connection element, a cable lug, a plate-shaped compacted electrical conductor of an electrical cable (e.g. a plate-shaped compacted stranded wire), a contact sleeve or another electrical contact. The invention is particularly advantageous for connecting two primarily flat electrical conductors or contact elements via a respective, primarily flat contact surface, in particular a side surface of the electrical conductor or contact element. The contact surface may also be rounded or have a stepped or other course.

According to the invention, the connection arrangement has a first fastening element that can be inserted into an aperture defined in the first electrical conductor.

The first fastening element can be inserted at least in portions into the aperture defined in the first conductor with an end portion provided for the mechanical connection, which is also referred to below as the "shank portion". In a fully assembled state of the first fastening element, this is preferably completely accommodated in the aperture with said shank portion; optionally, however, the shank portion can also partially protrude from the aperture at the opposite end of the aperture. The axial length of the shank portion of the first fastening element can thus be shorter than the axial depth of the aperture, correspond to the axial depth of the aperture, or also be longer than the axial depth of the aperture.

According to the invention, the first fastening element has a support surface with which it can be supported on a side of the first electrical conductor facing away from the second electrical conductor.

The shank portion of the first fastening element can preferably extend directly from the support surface along the mounting direction of the first fastening element. In particular, the first fastening element can have an abutment shoulder, on the end face of which facing the first electrical conductor the support surface is formed, preferably circumferentially in the shape of a ring. The first fastening element can preferably have a head portion at its end opposite the shank portion, in particular in the manner of a screw head, in order to form the abutment surface or the abutment shoulder.

In its fully assembled state, the first fastening element is preferably accommodated with the shank portion in the aperture defined in the first electrical conductor and rests with the support surface on a side surface of the first electrical conductor facing away from the second electrical conductor (hereinafter also referred to as the connecting surface of the first electrical conductor).

In the present case, it is advantageously possible to mount the first fastening element and/or the second fastening element starting from the sides facing away from contact surfaces of the two electrical conductors. Touching the contact surface or even supporting or holding against the contact surface with an assembly tool, for example, and the associated potential damage to the contact surface is therefore preferably ruled out.

The connection arrangement comprises a second fastening element which has a support surface with which it can be supported on a side of the second electrical conductor facing away from the first electrical conductor.

It may be provided that the support surface of the first fastening element and/or the second fastening element can be supported directly on the respective electrical conductor. However, indirect support can also be provided, for example by one or more additional components (e.g. washers, mounting profiles, mounting plates or support sleeves), which are arranged between the fastening element and the electrical conductor, for example to increase the abutment surface. The support surface can result monolithically from the fastening element; if necessary, however, the fastening element can also be designed as an assembly of several components, wherein the abutment surface and shank portion are designed in multiple parts, for example.

At this juncture, it should be mentioned that features described with regard to the first fastening element can also be transferred to the second fastening element (and vice versa)—insofar as this is not technically impossible. In particular, the features relating to the support surface, abutment shoulder and the head portion described above with regard to the first fastening element can also be transferred to the second fastening element.

The first fastening element and the second fastening element are hereinafter also referred to as "the fastening elements" or "the two fastening elements".

Preferably, the connection arrangement for connecting the two electrical conductors has only the first fastening element and the second fastening element and no other fastening elements. It is a particular advantage of the invention that just two fastening elements can be sufficient to establish the connection of the electrical conductors, which reduces the assembly effort and the manufacturing costs of the connection arrangement.

According to the invention, it is provided that the first fastening element and the second fastening element form a common primary threaded connection to connect the first electrical conductor frictionally and electrically to the second electrical conductor in a screwed-together state (preferably directly, but possibly also only indirectly, as described below using the example of a contact sleeve).

The sides of the electrical conductors facing each other, which are connected to each other electrically and frictionally according to the invention, are sometimes also referred to as "contact surfaces" in the following description. The contact surfaces are preferably side surfaces of the electrical conductors. However, the contact surfaces can also be formed by an end face of the electrical conductor.

It is therefore proposed to create the frictional connection between the electrical conductors by screwing the two fastening elements together. On the one hand, the clamping or pressing force can be extremely high and also particularly precisely adjustable due to the screw connection. In the fully screwed together or clamped together state, the respective support surfaces of the fastening elements are preferably in contact with the corresponding electrical conductors.

The fastening elements may have respective primary threaded elements (hereinafter referred to as primary internal thread and primary external thread) to form the primary threaded connection.

For the realization of the primary threaded connection between the two fastening elements, two alternative variants can be provided in particular within the scope of the present invention.

According to a first variant described in more detail herein, the second fastening element can form a shank portion at an end portion facing the electrical conductors. The shank portion can extend from the support surface of the second fastening element along the mounting direction of the second fastening element. In this variant, the second fastening element can in particular be a screw-like fastening element. The shank portion of the second fastening element can therefore be screwed into the first fastening element.

However, as an alternative to a shank portion, according to a second variant described in greater detail herein, it is also possible for the second fastening element to have a fastening recess running along the mounting direction. In this variant, the second fastening element can in particular be a screw-nut-like fastening element. The shank portion of the first fastening element can therefore be screwed into said fastening recess of the second fastening element. In this case, the support surface of the screw-nut-like second fastening element can preferably be formed by an abutment flange of the screw nut.

According to the invention, it is provided that the first fastening element has a mechanical connection interface for a captive connection to the first electrical conductor.

Preferably, the first fastening element and/or the second fastening element is not pressed with the first electrical conductor, in particular not pressed into the aperture defined in the first electrical conductor. Preferably, the first fastening element and/or the second fastening element is not pressed with the second electrical conductor, in particular not pressed into the aperture defined in the second electrical conductor mentioned below. Preferably, no press fit is provided for the connection between the fastening elements and the electrical conductors. This can be advantageous, since pressing in, even if this is done starting from the side facing away from the contact surface, generally requires at least counter-holding on the contact surface, which can, however, damage the contact surface.

It is an advantage of the invention that the first fastening element can initially be connected to the first electrical conductor captively, preferably without any pressing-in within the aperture defined in the first electrical conductor. In this way, damage to the electrical conductor, in particular in the region of the contact surface, can be avoided, which may otherwise lead to problems with the current transmission between the electrical conductors, as can sometimes occur with a press fit or riveted connection, for example. The contact resistance can therefore be particularly low due to the proposed frictional connection. The proposed connection arrangement can lead to a durable and robust connection of the electrical conductors.

In the context of the present invention, a “captive connection” is to be understood in particular to provide protection against loss with regard to the subsequent assembly steps and/or a common delivery state of the first electrical conductor and the first fastening element. The mechanical interface should therefore provide at least protection against loss with regard to storage, transportation and/or the work steps to be expected during assembly until the protection against loss is finally taken over or supported by screwing to the second fastening element. The captive connection can preferably represent a temporary pre-fixing—at least for a (short) transitional period. In contrast to the later final fixing, the robustness and durability of the captive connection therefore generally does not need to be taken into account. Any fatigue behavior of the captive pre-fixing can sometimes be disregarded.

The fact that the first fastening element can initially be connected to the first electrical conductor captively means that the assembly effort for the connection arrangement or the connection system can be particularly low.

The main advantage of the present invention is that the subsequent final fixing, i.e. the frictional connection of the electrical conductors, is in principle based exclusively on the screw connection of the two fastening elements. Therefore, the mechanical properties of the connection arrangement can be determined independently of the electrical properties. For example, a harder material can be provided for the fastening elements than for the electrical conductors, for which, on the other hand, a material with advantageous properties for current transmission can be selected.

In an advantageous development of the invention, which has already been referred to above as the “first variant”, it can be provided that the second fastening element has a shank portion and is designed in the manner of a screw element, preferably in the form of a pin or bolt. The first fastening element can then preferably be sleeve-shaped, for example in the manner of a screw nut. The second fastening element can therefore be screwed into the first fastening element using the primary threaded connection.

The first fastening element can therefore have a primary internal thread for the primary threaded connection to the second fastening element.

The primary internal thread of the first fastening element, in particular of the sleeve-shaped first fastening element, preferably extends at least in portions through the shank portion of the first fastening element, in particular starting from the end of the shank portion that faces the second fastening element for mounting. The primary internal thread can extend completely, but preferably only in portions, through the first fastening element or its shank portion.

In a development of the invention, which has already been referred to above as the “second variant”, it may alternatively be provided that the second fastening element is sleeve-shaped, for example in the manner of a screw nut. The first fastening element can then preferably be designed in the form of a pin or bolt, for example in the manner of a screw element. The first fastening element can therefore be screwed into the second fastening element using the primary threaded connection.

The first fastening element can thus have a primary external thread for the primary threaded connection to the second fastening element.

The primary external thread of the first fastening element, in particular of the bolt-shaped first fastening element, preferably extends at least partially along the shank portion of the first fastening element, in particular starting from the end of the shank portion which faces the second fastening element for mounting. It may be provided that the shank portion with the primary external thread protrudes from the aperture of the first electrical conductor in the direction of the second electrical conductor when the first fastening element is located in the aperture of the first electrical conductor in its mounted state.

The primary internal thread of the first fastening element can be arranged at least partially in the same axial portion along a central axis of the first fastening element at which the mechanical connection interface for the captive connection is also located. It can therefore be provided, for example, that the primary internal thread is arranged at least in portions in the same axial portion as the secondary external thread of the connection interface mentioned below.

Alternatively, it can also be provided that the primary external thread of the first fastening element is arranged at a different axial portion than the mechanical connection interface, in particular therefore not in an axial portion overlapping with the secondary external thread. The primary external thread is preferably assigned to the end of the first fastening element that faces the second fastening element, wherein the secondary external thread, by contrast, can be arranged at the end facing away from the second fastening element.

According to a development of the invention, it may be provided that the shank portion of the first fastening element has the mechanical connection interface in order to enter into the captive connection with the first electrical conductor, preferably within the aperture defined in the first electrical conductor.

However, the mechanical connection interface can also be formed on a portion of the first fastening element that is different from the shank portion, for example also in the region of the support surface, within the support surface or starting from the support surface. For example, the connection interface can be formed as an elevation or indentation on the support surface that can be latched to the first electrical conductor. Preferably, however, the mechanical connection interface is formed along the shank portion.

According to a development of the invention, it may be provided that the mechanical connection interface on the side facing the second electrical conductor does not emerge from the aperture defined in the first electrical conductor when the support surface of the first fastening element is supported on the first electrical conductor or when the first fastening element is in its mounted state.

A connection interface that does not emerge from the aperture can be particularly advantageous if the first fastening element is a sleeve-shaped fastening element, for example in the manner of a screw nut. In this case, even with geometric tolerances, it can be ensured that the second electrical conductor or its contact surface is not mechanically influenced by the first fastening element as part of the frictional connection. The two electrical conductors are therefore still able to lie plane or flat on top of each other even in the event of tolerances.

According to a preferred development of the invention, it may be provided that the mechanical connection interface forms or realizes the captive connection by means of a secondary threaded connection to the first electrical conductor.

In particular (but not exclusively), the secondary threaded connection can ensure that the first fastening element can already be connected to the first electrical conductor captively during pre-assembly or a first assembly step.

Advantageously, the secondary threaded connection can ensure sufficient torque support when screwing the two fastening elements together. The assembly effort of the connection arrangement or the connection system can thus be reduced even further, since screwing the two fastening elements together in this development is possible without further measures, such as counter-holding with an additional screwing tool. Insofar as a secondary threaded connection is provided between the first fastening element and the first electrical conductor, the assembly of the first fastening element can therefore be particularly simple and convenient for the assembler.

In a development of the invention, it may be provided that the mechanical connection interface of the first fastening element forms the secondary threaded connection to the first electrical conductor within the aperture defined in the first electrical conductor.

Preferably, the directions of rotation of the secondary threaded connection and the primary threaded connection are opposite to each other. In this way, the secondary threaded connection can tighten even further in the first electrical conductor during the mutual screwing together of the two fastening elements—or at least not be loosened. However, directions of rotation in the same direction can also be provided if necessary (less preferred), especially if the secondary threaded connection has a higher holding force or self-locking force than the primary threaded connection, so that the screw connection of the secondary threaded connection also does not unintentionally loosen when the primary threaded connection is tightened.

In particular, it can be provided that the direction of rotation of the primary threaded connection is clockwise (In relation to the screw-in direction of the second fastening element) and the direction of rotation of the secondary threaded connection is counterclockwise (In relation to the screw-in direction of the first fastening element).

The primary threaded connection and/or the secondary threaded connection can be a metric standard thread, for example only, and not limited to, M3, M4, M5, M6, M7 or M8. The primary threaded connection preferably has a smaller cross-section than the secondary threaded connection. For example, the primary threaded connection can be a metric M5 thread and the secondary threaded connection can be, for example, a metric M7 or M8 thread.

It should be mentioned at this juncture that, as an alternative or in addition to a secondary threaded connection, a non-rotating connection can also be provided in special cases (less preferably)—in addition to the captive connection. For example, the mechanical connection interface of the first fastening element and/or the first electrical conductor, in particular within the aperture, can have corresponding polygonal cross-sections. Locking pins, latching elements or the like can also be provided to provide additional protection against rotation of the first fastening element relative to the first electrical conductor.

In a development of the invention, it can be provided that the mechanical connection interface of the first fastening element has a self-tapping, secondary external thread in order to cut a corresponding, secondary internal thread into a circumferentially extending edge of the aperture defined in the first electrical conductor.

The fact that the secondary internal thread is cut into the aperture by the screwing-in process of the first fastening element means that an additional assembly or manufacturing step for inserting the secondary internal thread can be saved. This can further reduce the manufacturing and assembly costs as well as the risk of damage to the first electrical conductor. In principle, however, it is also possible for the aperture defined in the first electrical conductor to already have a secondary internal thread before the first fastening element is mounted in the aperture.

The self-tapping, secondary external thread of the first fastening element can preferably have one to ten threads, particularly preferably one to five threads, very particularly preferably two to three threads.

When using a self-tapping secondary external thread of the first fastening element as a mechanical connection interface, it is optionally possible to provide one or more chip traps between the first fastening element and the first electrical conductor within the aperture. In particular, these can be areas between the first fastening element and the first electrical conductor in which the chips from the thread cutting can accumulate and possibly also remain during subsequent operation. A chip trap can, for example, directly adjoin the support surface of the first fastening element and/or can be formed in the region of the end of the first fastening element facing away from the support surface. In the assembled state of the first fastening element, the chip trap can preferably also be completely closed within the aperture defined in the first electrical conductor, so that the chips remain safely within the chip trap and do not escape unintentionally.

However, the chip trap is basically optional, since, depending on the design of the self-tapping external thread and the materials used for the electrical conductor and the fastening element, any chips produced can be prevented or at least minimized anyway.

In an advantageous development of the invention, it can be provided that the first fastening element and the second fastening element each have a mechanical interface for connection to a screwing tool in order to transmit a torque from the screwing tool to the respective fastening element.

Preferably, the same interface type is provided for the mechanical interface of both fastening elements. The fact that the same interface type is used for both fastening elements can further simplify assembly for the assembler, as only a single screwing tool is required for assembly.

Preferably, the mechanical interface of the first fastening element and/or the second fastening element is recessed within the respective fastening element. However, an external mechanical interface can also be provided.

In principle, the mechanical interface can be any screw head drive, preferably an internal hexagon, a slotted profile or a cross-slotted profile. An external hexagon, external square or other screw head drive can also be provided in principle.

In a development of the invention, it may be provided that the first fastening element and/or the second fastening element are formed from a material with higher mechanical strength than the first electrical conductor and/or the second electrical conductor.

Preferably, the first fastening element and/or the second fastening element is made of steel. The electrical conductors can be made of copper, aluminum or an alloy of the aforementioned metals, for example.

It should be mentioned at this juncture that an electrical connection can optionally also be provided via a secondary current path that runs through the two fastening elements, even if the fastening elements are generally less suitable for high current transmission than the contact surfaces of the electrical conductors.

In an advantageous development of the invention, it can be provided that the second fastening element is designed in the form of a pin or bolt, for example as a screw or screw element.

The second fastening element, in particular the bolt-shaped second fastening element, can be guided through an aperture defined in the second electrical conductor and can be screwed into the first fastening element with the end portion or shank portion which is at the front in the mounting direction, when the first fastening element is received in the aperture of the first electrical conductor or is in its mounted state. The screw connection to the first fastening element can be provided within the aperture defined in the second electrical conductor, within the aperture defined in the first electrical conductor and/or in a region between the two electrical conductors (the latter in particular if the frictional connection of the electrical conductors takes place indirectly, for example via the contact sleeve mentioned below).

In a development of the invention, it can also be provided that the second fastening element is sleeve-shaped, for example as a screw nut.

The second fastening element, in particular the sleeve-shaped second fastening element, can be screwed onto a primary external thread of the first fastening element that may be or may not be protruding from an aperture defined in the second electrical conductor when the first fastening element is received in the aperture defined in the first electrical conductor (and preferably also in the aperture in the second electrical conductor) or when the first fastening element is in its mounted state.

At this juncture, it should be mentioned that the support surface of the fastening elements does not necessarily have to be formed on a head portion of the fastening element. Within the scope of the invention, it may also be provided, for example, to use an end face of the first fastening element and/or the second fastening element as a stop surface, for example in order to contact the respective electrical conductor on a step, or on a shoulder, within one of the apertures.

The invention also relates to a connection system, in particular a connection system for high-voltage technology, comprising a connection arrangement according to the herein disclosed preceding and following embodiments, the first electrical conductor and the second electrical conductor.

The first fastening element can be inserted into the aperture defined in the first electrical conductor and connected to the second fastening element via the common primary threaded connection.

Optionally, the second fastening element can be inserted into an aperture in the second electrical conductor when the fastening elements are connected to each other. Alternatively, a lateral arrangement of the second fastening element next to the second electrical conductor is also possible, in which no aperture is provided. The second fastening element can, for example, be arranged in a lateral slot or notch or in a lateral retaining clip or other fastening device of the second electrical conductor.

In an advantageous development of the invention, it can be provided that the aperture defined in the first electrical conductor is arranged coaxially to the aperture defined in the second electrical conductor.

The aperture defined in the second electrical conductor preferably has a smaller cross-sectional geometry than the aperture defined in the first electrical conductor. However, it may also be possible for the aperture defined in the second electrical conductor to have a cross-sectional geometry larger than or identical to the aperture defined in the first electrical conductor.

Preferably, the aperture defined in the second electrical conductor has a larger cross-sectional extent than the first fastening element and/or than the second fastening element (in particular larger than the first fastening element). The aperture defined in the second electrical conductor can, for example, be designed as an oversized through-hole or as a slot. In this way, tolerances can be compensated for advantageously.

In an advantageous development of the invention, it may be provided that the aperture defined in the first electrical conductor and/or the aperture defined in the second electrical conductor are designed as a round through-hole.

The aperture defined in the second electrical conductor is preferably designed as a threadless through-hole. Preferably, the aperture defined in the second electrical conductor does not have an internal thread, even in the assembled state. It is therefore preferably also not provided to cut an internal thread into the aperture during assembly, as can optionally be provided for the aperture defined in the first electrical conductor.

The aperture defined in the first conductor and/or the second conductor is preferably a non-stepped aperture or a non-stepped, smooth bore. However, a stepped aperture or a stepped bore with different internal cross-sections can also be provided, for example to provide support edges.

In a development of the invention, it can be provided that the connection system has an electrical contact sleeve arranged between the first electrical conductor and the second electrical conductor in order to establish an indirect electrical and mechanical connection between the first electrical conductor and the second electrical conductor when the first fastening element is in the state screwed to the second fastening element.

The use of a contact sleeve to connect the two electrical conductors can be an alternative to directly contacting the respective contact surfaces of the electrical conductors. Instead of a contact sleeve, any electrically conductive intermediate element can be provided. Several contact sleeves or other electrically conductive intermediate elements can also be arranged between the electrical conductors and clamped frictionally by screwing the fastening elements together.

The additional electrical contact sleeve can be provided, among other things, to purposefully influence the electrical properties when connecting the electrical conductors, to bridge a defined distance between the electrical conductors and/or to create the geometric conditions for supplementing the connection system with a contact protection device so that, for example, insulating housing components can be used for the electrical conductors.

It can be provided that the mechanical connection interface of the first fastening element emerges from the aperture defined in the first electrical conductor and enters the contact sleeve on the side facing the second electrical conductor in the assembled state of the first fastening element. Optionally, the mechanical connection interface can also extend the captive connection, preferably the secondary threaded connection, into the contact sleeve. Thus, for example, a pre-assembled, captive state can be provided between the first fastening element, the first electrical conductor and the contact sleeve. For example, the self-tapping, secondary external thread of the first fastening element can cut a corresponding secondary internal thread within the contact sleeve.

However, the mechanical interface can in principle also be limited exclusively to the connection to the first electrical conductor. In this case, the internal cross-sectional geometry of the contact sleeve is preferably larger than the external cross-sectional geometry of the first fastening element in the end portion or shank portion that projects into the contact sleeve.

The invention also relates to a method for connecting a first electrical conductor to a second electrical conductor, comprising at least the following method steps: providing a first electrical conductor; providing a second electrical conductor; providing a first fastening element having a support surface and a mechanical connection interface for a captive connection to the first electrical conductor, preferably for a secondary threaded connection to the first electrical conductor; inserting the first fastening element into an aperture in the first electrical conductor until the captive connection, preferably the secondary threaded connection, of the first fastening element to the first electrical conductor is established; providing a second fastening element having a support surface; and screwing the second fastening element to the first fastening element via a common primary threaded connection until the support surface of the second fastening element is supported on a side of the second electrical conductor facing away from the first electrical conductor and the first electrical conductor and the second electrical conductor are frictionally and electrically connected to each other.

As part of the method step of inserting the first fastening element into the aperture defined in the first electrical conductor, it may be provided that the first fastening element is inserted into the aperture defined in the first electrical conductor until its support surface is supported on a side of the first electrical conductor facing away from the second electrical conductor. Alternatively, it can also be provided that the support surface is initially still spaced from the first electrical conductor after the first fastening element has been inserted—for example, the subsequent screwing to the second fastening element (or another subsequent method step) can then lead to the first fastening element penetrating further into the aperture defined in the first electrical conductor until the support surface is in contact with the first electrical conductor.

For example, a first fastening element designed as a socket or screw element can be inserted into the aperture defined in the first electrical conductor in a first assembly step, for example a pre-assembly step-preferably, but not necessarily, until the support surface is contacted. The first fastening element can optionally be secured axially and radially via a self-tapping or metric external thread within the aperture of the electrical conductor. This assembly step can, in principle, provide a screw-on socket or stud bolt in the first electrical conductor without directly influencing the contact surface of the first electrical conductor, which can prevent damage to the contact surface. Subsequently, in a second assembly step, for example a final assembly step, the second fastening element can be connected to the second electrical conductor and screwed to the first fastening element in such a way that the two electrical conductors are frictionally connected to one another.

Any pressing, press-fitting or riveting can be advantageously dispensed with in the context of the invention. Stress cracks on the components involved can thus be avoided.

At this juncture, it should be emphasized that the method steps do not necessarily have to be carried out in the order in which they are described or mentioned in the description herein or in the claims. For example, individual method steps or groups of method steps may therefore be interchangeable, provided this is not technically impossible. Method steps can also be combined with each other, divided into separate intermediate steps or supplemented with intermediate steps. The method is also not necessarily exhaustively described with the method steps mentioned here and can be supplemented with further method steps, including those not listed.

Features which have been described in conjunction with one of the objects of the invention, namely given by the connection arrangement according to the invention, the connection system according to the invention and the method according to the invention, can also be advantageously implemented for the other objects of the invention. Similarly, advantages mentioned in conjunction with one of the objects of the invention can also be understood in relation to the other objects of the invention.

In addition, it should be noted that terms such as “comprising”, “having” or “with” do not exclude other features or steps. Furthermore, terms such as “a” or “that”, which indicate a singular number of steps or features, do not exclude a plurality of features or steps- and vice versa.

It should be noted that designations such as “first” or “second” etc. are used primarily for reasons of differentiation of respective device or method features and are not necessarily intended to imply that features are mutually dependent or related to each other.

Furthermore, it should be emphasized that the values and parameters described herein include deviations or fluctuations of ±10% or less, preferably ±5% or less, more preferably ±1% or less, and most preferably 0.1% or less of the respective designated value or parameter, provided that these deviations are not excluded when the invention is implemented in practice. The specification of ranges by initial and final values also includes all those values and fractions which are included by the respectively designated range, in particular the initial and final values and a respective mean value.

In the following, exemplary embodiments of the invention are described in greater detail with reference to the drawings.

The figures each show preferred embodiments in which individual features of the present invention are shown in combination with one another. Features of an exemplary embodiment can also be implemented separately from the other features of the same exemplary embodiment and can accordingly be readily combined by a person skilled in the art to form further useful combinations and sub-combinations with features of other exemplary embodiments.

SUMMARY

Our invention generally provides a first electrical conductor; a second electrical conductor: a first fastening element; and a second fastening element that is connectable to the first fastening element so as to electrically and frictionally connect the first electrical conductor to the second electrical conductor.

A principal aspect of the present invention is a connection arrangement (4) for connecting a first electrical conductor (2) to a second electrical conductor (3), said connection arrangement comprising a first fastening element (6) that can be inserted into an aperture (9*a*) in the first electrical conductor (2) and has a support surface (11*a*) with which it can be supported on a side of the first electrical conductor (2) facing away from the second electrical conductor (3), and a second fastening element (7) which has a support surface (11*b*) with which it can be supported on a side of the second electrical conductor (3) facing away from the first electrical conductor (2), and wherein the first fastening element (6) and the second fastening element (7) form a common primary threaded connection (18) in order to connect the first electrical conductor (2) frictionally and electrically to the second electrical conductor (3) in a screwed-together state, characterized in that the first fastening element (6) has a mechanical connection interface (13) for a captive connection to the first electrical conductor (2).

A further aspect of the present invention is a connection arrangement (4) characterized in that the first fastening element (6) is sleeve-shaped and has a primary internal thread (10) for the primary threaded connection (18) to the second fastening element (7), wherein the primary internal thread (10) preferably extends through the first fastening element (6) starting from the end portion of the first fastening element (6) that faces the second fastening element (7): or is bolt-shaped and has a primary external thread (17) for the primary threaded connection (18) to the second fastening element (7), wherein the primary external thread (17) of the bolt-shaped first fastening element (6) extends at least partially along an end portion of the first fastening element (6), which preferably protrudes from an aperture (9*b*) of the second electrical conductor (3) on the side facing away from the first electrical conductor (2).

A further aspect of the present invention is a connection arrangement (4) characterized in that the first fastening element (6) has a shank portion (8*a*) which extends from the support surface (11*a*) into the aperture (9*a*) of the first electrical conductor (2), wherein the shank portion (8*a*) has the mechanical connection interface (13) for making the captive connection to the first electrical conductor (2) within its aperture (9*a*).

A further aspect of the present invention is a connection arrangement (4) characterized in that the mechanical connection interface (13) on the side facing the second electrical conductor (3) does not emerge from the aperture (9*a*) of the first electrical conductor (2) when the support surface (11*a*) of the first fastening element (6) is supported on the first electrical conductor (2).

A further aspect of the present invention is a connection arrangement (4) characterized in that the mechanical connection interface (13) of the first fastening element (6) forms a secondary threaded connection (14) for the captive connection within the aperture (9*a*) of the first electrical conductor (2) to the first electrical conductor (2), wherein the directions of rotation of the secondary threaded connection (14) and the primary threaded connection (18) are preferably opposite to each other.

A further aspect of the present invention is a connection arrangement (4) characterized in that the mechanical connection interface (13) of the first fastening element (6) has a self-tapping, secondary external thread in order to cut a corresponding, secondary internal thread (15) into the aperture (9*a*) of the first electrical conductor (2).

A further aspect of the present invention is a connection arrangement (4) characterized in that the first fastening element (6) and the second fastening element (7) each have a mechanical interface (16) for connection to a screwing tool in order to transmit a torque from the screwing tool to the respective fastening element (6, 7), wherein the same type of interface is preferably provided in both fastening elements (6, 7).

A further aspect of the present invention is a connection arrangement (4) characterized in that the first fastening element (6) and the second fastening element (7) are each formed from a material with higher mechanical strength than the first electrical conductor (2) and/or the second electrical conductor (3), preferably steel.

A further aspect of the present invention is a connection arrangement (4) characterized in that the second fastening element (7) is designed as a screw which can be guided through an aperture (9*b*) of the second electrical conductor (3) and can be screwed into the first fastening element (6) when the first fastening element (6) is received in the aperture (9*a*) of the first electrical conductor (2); or is designed as a screw nut which can be screwed onto a primary external thread (17) of the first fastening element (6) protruding from an aperture (9*b*) in the second electrical conductor (3) when the first fastening element (6) is received in the aperture (9*a*) in the first electrical conductor (2).

A further aspect of the present invention is a connection system (1), in particular connection system (1) for high-voltage technology, comprising a connection arrangement (4), a first electrical conductor (2) and a second electrical conductor (3), and wherein the first fastening element (6) is inserted into the aperture (9*a*) of the first electrical conductor (2) and is connected to the second fastening element (7) via the common primary threaded connection (18).

A further aspect of the present invention is a connection system (1) characterized in that the aperture (9*a*) of the first electrical conductor (2) is arranged coaxially to an aperture (9*b*) of the second electrical conductor (3), through which the first fastening element (6) and/or the second fastening element (7) extends.

A further aspect of the present invention is a connection system (1) characterized in that the aperture (9*a*) of the first electrical conductor (2) and/or the aperture (9*b*) of the second electrical conductor (3) are formed as a round through-hole, preferably as a threadless through-hole.

A further aspect of the present invention is a connection system (1) characterized in that the first electrical conductor (2) and the second electrical conductor (3) each have, on a side facing the other electrical conductor (2, 3), an electrical contact surface (5) provided for mutual connection for current transmission, wherein the first electrical conductor (2) and the second electrical conductor (3) are preferably designed as high-voltage contact elements, particularly preferably as a busbar or cable lug.

A further aspect of the present invention is a connection system (1) characterized by an electrical contact sleeve (20) arranged between the first electrical conductor (2) and the second electrical conductor (3) in order to establish an indirect electrical and mechanical connection between the first electrical conductor (2) and the second electrical conductor (3) when the first fastening element (6) is in the state screwed to the second fastening element (7).

A further aspect of the present invention is a method for connecting a first electrical conductor (2) to a second electrical conductor (3), comprising at least the following steps: providing a first electrical conductor (2): providing a second electrical conductor (3); providing a first fastening element (6) having a support surface (11*a*) and a mechanical connection interface (13) for a captive connection to the first electrical conductor (2); inserting the first fastening element (6) into an aperture (9*a*) in the first electrical conductor (2) until the captive connection to the first electrical conductor (2) is established; providing a second fastening element (7) having a support surface (11*b*); and screwing the second fastening element (Z) to the first fastening element (6) via a common primary threaded connection (18) until the support surface (11*b*) of the second fastening element (7) is supported on a side of the second electrical conductor (3) facing away from the first electrical conductor (2) and the first electrical conductor (2) and the second electrical conductor (3) are frictionally and electrically connected to each other.

These and other aspects of the present invention are more fully set forth and disclosed herein.

BRIEF DESCRIPTIONS OF THE FIGURES

In the figures, elements with the same function are provided with the same reference signs.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
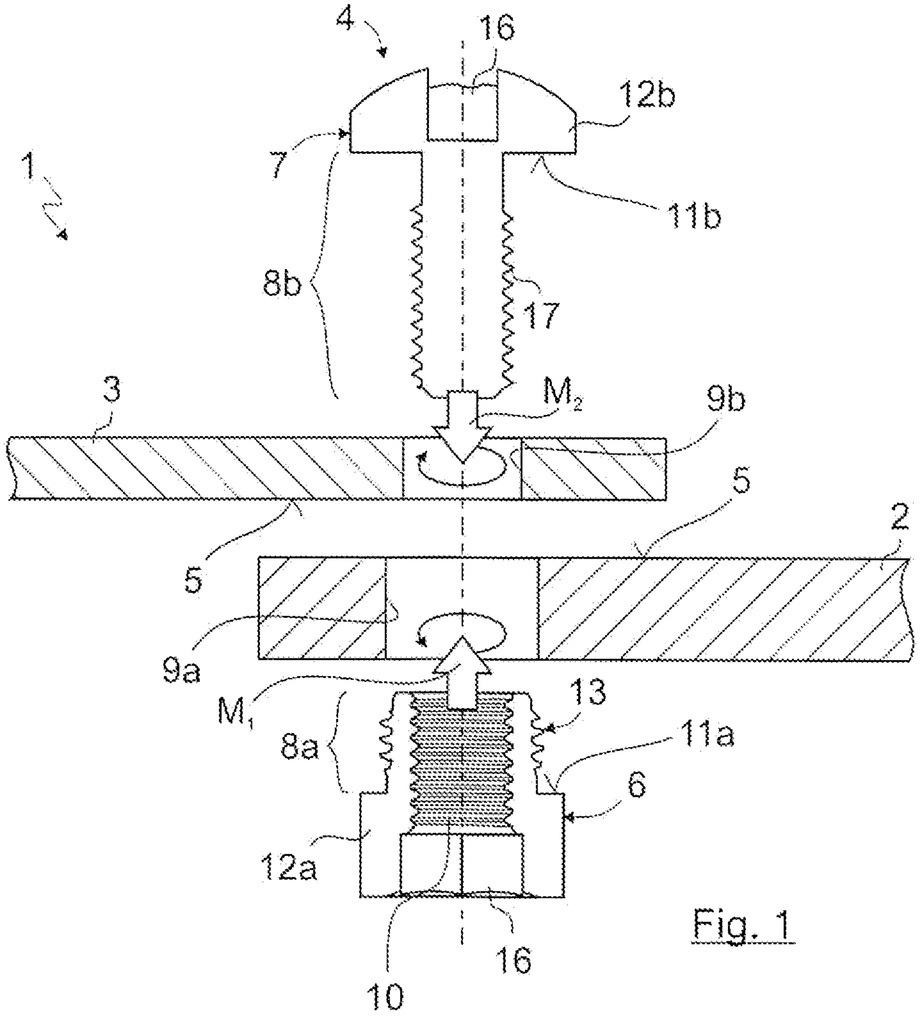
FIG. 1 shows a connection system according to a first exemplary embodiment of the invention, comprising a two-part connection arrangement and two electrical conductors, in a sectional side view during assembly.
Figure 2:
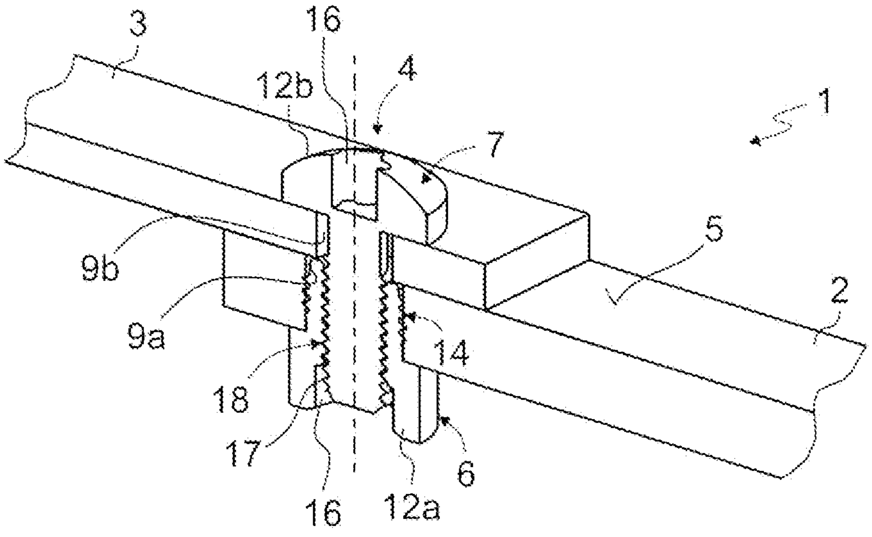
FIG. 2 shows the connection arrangement according to FIG. 1 in an assembled state, in a sectional perspective view.
Figure 3:
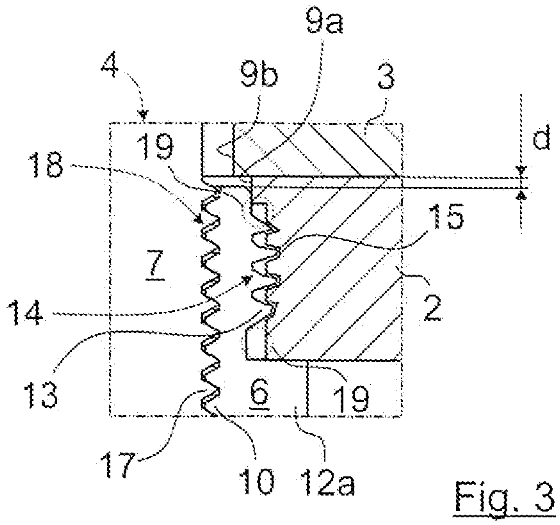
FIG. 3 shows an enlarged detail of the mechanical connection interface of the first fastening element of the connection arrangement according to FIG. 2, which connection interface is connected to the first electrical conductor.

FIGS. 1 to 3 show a connection system 1 according to a first exemplary embodiment of the invention. The connection system 1 described in the exemplary embodiments is particularly suitable for use in high-voltage technology, but can, in principle, be used in all electrical engineering applications, FIG. 1 shows a disassembled state of the connection system 1 in a sectional side view and FIG. 2 shows an assembled state in a perspective sectional view. FIG. 3 shows an enlarged detail in the assembled state.

The connection system 1 has a first electrical conductor 2 and a second electrical conductor 3, as well as a connection arrangement 4 to connect the two electrical conductors 2, 3 to each other electrically and frictionally. The electrical conductors 2, 3 can be, for example only and without limitation, high-voltage contact elements, in particular busbars or cable lugs.

It is provided to press two opposing contact surfaces 5 (cf. FIG. 1) of the electrical conductors 2, 3 flat against each other, wherein in principle any contacting, for example also an end-face or other contacting of the electrical conductors 2, 3 can be provided.

The connection arrangement 4 has a first fastening element 6 and a second fastening element 7. The first fastening element 6 can be inserted into an aperture 9*a* defined in the first electrical conductor 2 with a shank portion 8*a* that is located in front in the mounting direction $M_1$, (i.e. facing the second fastening element 7). In the exemplary embodiment, the aperture 9*a* defined in the first electrical conductor 9 is a round, threadless through-hole.

In the exemplary embodiments shown in FIGS. 1 to 3 and 5, the first fastening element 6 is sleeve-shaped for example, in the manner of a screw nut. Accordingly, the first fastening element 6 has a primary internal thread 10. The primary internal thread 10 extends along the shank portion 8*a*, which is directly connected to a support surface 11*a* (see FIG. 1), which is formed on the end face of a shoulder of a head portion 12*a* (screw-head-like shaping) of the first fastening element 6. The first fastening element 6 is able to support itself with said support surface 11*a* on the side of the first electrical conductor 2 facing away from the second electrical conductor 3 when the first fastening element 6 is in its mounted state in the aperture 9*a* defined in the first electrical conductor 2.

The first fastening element 6 also has a mechanical connection interface 13 for a captive connection to the first electrical conductor 2. The captive connection is preferably a secondary threaded connection 14 with the first electrical conductor 2. In the exemplary embodiments, the mechanical connection interface 13 is designed as a self-tapping, secondary external thread 13, with which a corresponding, secondary internal thread 15 (cf. FIG. 3) can be cut into the aperture 9*a* or the through-hole defined in the first electrical conductor 2. The mechanical connection interface 13 of the first fastening element 6 thus forms the secondary threaded connection 14 within the aperture 9*a* defined in the first electrical conductor 2 with the first electrical conductor 2.

The mechanical connection interface 13 or the self-tapping, secondary external thread 13 is formed along the shank portion 8*a* and, in the assembled state of the first fastening element 6, is arranged within the aperture 9*a* or the through-hole of the first electrical conductor 2. Optionally, a safety distance "d" can be provided between the front end of the shank portion 8*a* in the mounting direction $M_1$ and the end of the aperture 9*a* on the contact surface side in the mounted state of the first fastening element 6, as shown in FIG. 3. In this way, it can be ensured that the first fastening element 6 does not protrude from the aperture 9*a* in a disruptive manner and, for example, does not damage the contact surface S of the second electrical conductor 3, even in a case with tolerances.

Preferably, as part of a first method step for connecting the two electrical conductors 2, 3, it can be provided to insert the first fastening element 6 into the aperture 9*a* defined in the first electrical conductor 2 until it forms the captive connection, i.e. in particular the secondary threaded connection 14 (preferably until the support surface 11*a* is supported on a side of the first electrical conductor 2 facing away from the second electrical conductor 3). In order to transmit a suitable torque from a screwing tool (not shown) to the first fastening element 6, the latter preferably has a mechanical interface 16 for connection to the screwing tool, for example a hexagon socket drive.

The second fastening element 7 of the connection arrangement 4 also has a support surface 11*b* (cf. FIG. 1), with which it can be supported on a side of the second electrical conductor 3 facing away from the first electrical conductor 2. In the exemplary embodiments of FIGS. 1 to 3 and 5, the second fastening element 7 is bolt-shaped in the manner of a screw element and has a primary external thread 17, which extends along a shank portion 8*b* (see FIG. 1) of the second fastening element 7. The support surface 11*b* is formed on the end face of a head portion 12*b* of the second fastening element 7, which can also have a mechanical interface 16 for connection to a screwing tool, preferably a mechanical interface 16 of the same interface type as in the case of the first fastening element 6. In the exemplary embodiments, however, different interface types are shown by way of example.

The second fastening element 7 can be passed through an aperture 9*b*, in the exemplary embodiments again a through-hole, defined in the second electrical conductor 3 and in this way can be screwed into the first fastening element 6. The primary internal thread 10 of the first fastening element 6 and the primary external thread 17 of the second fastening element 7 ultimately form a common primary threaded connection 18 in order to connect the first electrical conductor 2 frictionally and electrically to the second electrical conductor 3 in a screwed-together state.

Thus, in a second method step, the second fastening element 7 can be connected to the first fastening element 6 via the common primary threaded connection 18 until the support surface 11*b* of the second fastening element 7 is supported on the side of the second electrical conductor 3 facing away from the first electrical conductor 2 and the two electrical conductors 2, 3 are frictionally connected to one another.

The primary threaded connection 18 and the secondary threaded connection 14 are preferably designed with an opposite direction of rotation, as indicated by corresponding arrows in FIG. 1. For example, the direction of rotation of the primary threaded connection 18 can be clockwise along the mounting direction $M_2$ of the second fastening element 7 and the direction of rotation of the secondary threaded connection 14 can be counterclockwise along the mounting direction $M_1$ of the first fastening element 6. In this way, the secondary threaded connection 14 is not able to loosen during the screwing of the first fastening element 6 into the second fastening element 7, but rather is screwed even more tightly to the first electrical conductor 2 in case of doubt.

In the proposed manner, a frictional and electrical connection between the two electrical conductors 2, 3 can be established by the screw connection of the two fastening elements 6, 7. The first fastening element 6 and the second fastening element 7 are preferably each made of a material with higher mechanical strength than the electrical conductors 2, 3. Particularly preferably, the two fastening elements 6, 7 are made of the same material, but of a different material than the electrical conductors 2, 3. The electrical conductors 2, 3 can be made of copper or aluminum, for example, and the fastening elements 6, 7 can be made of steel. Therefore, signs of fatigue of the mechanical connection can be avoided even at high temperatures.

As shown in the exemplary embodiments, the through-hole or the aperture 9*b* defined in the second electrical conductor 3 in particular can be oversized with respect to the second fastening element 7 (or the first fastening element 6), for example also as a slot.

It should be noted at this juncture that the second electrical conductor 3 does not necessarily have to have an aperture 9*b*. In principle, the second fastening element 7 can also be mounted laterally, optionally in a lateral recess in the second electrical conductor 3.

Optionally, when using the self-tapping, secondary external thread 13 of the first fastening element 6, one or more "chip traps" chip-traps 19 can be provided between the first fastening element 6 and the first electrical conductor 2. This is illustrated in FIG. 3.

FIG. 3 shows an example of two cavities between the first fastening element 6 and the first electrical conductor 2 in the fully assembled state, in which chips may accumulate. The cavities or chip traps 19 are completely closed by a diameter step within the aperture 9*a* of the first electrical conductor 2 and the support surface 11*a* of the first fastening element 6, so that the chips cannot escape during operation.

Figure 4:
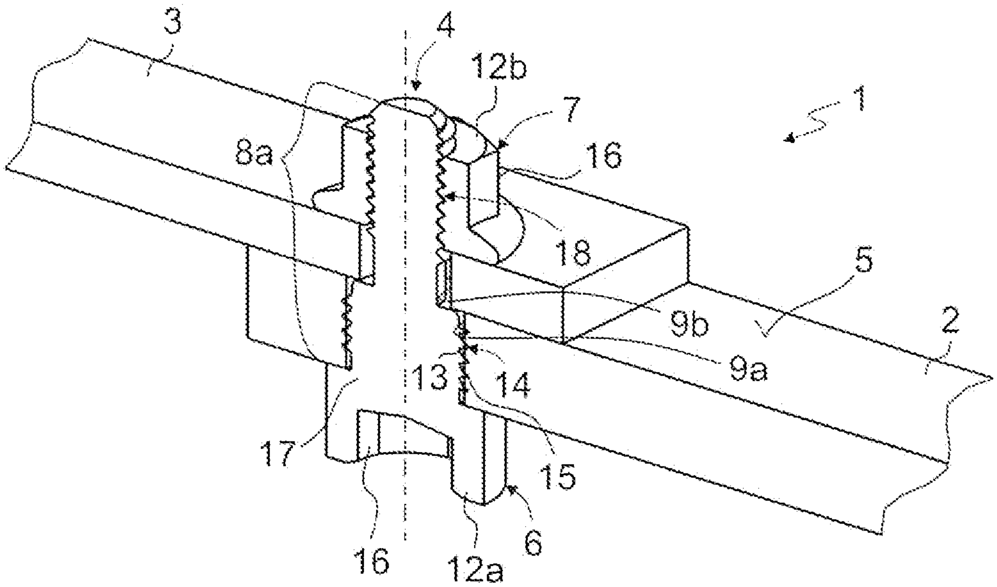
FIG. 4 shows a connection system according to a second exemplary embodiment of the invention in an assembled state, in a sectional perspective view.

FIG. 4 illustrates a second exemplary embodiment of a connection system 1 according to the invention, in which the first fastening element 6 is in the form of a bolt or is designed in the manner of a screw element. Again, a self-tapping, secondary external thread 13 is provided in order to cut a corresponding secondary internal thread 15 into the aperture 9*a* defined in the first electrical conductor 2. However, the connection to the second fastening element 7 is not made within the first fastening element 6, but on the shank portion 8*a* of the first fastening element 6, on which there is a primary external thread 17 for the primary threaded connection 18 to the second fastening element 7. The cross-section of the first fastening element 6 can optionally be reduced in the region of the primary external thread 17 (depending on the cross-section of the aperture 9*b* in the second electrical conductor 3). Lastly, the second fastening element 7 can be designed as a corresponding screw nut, which can be screwed onto the shank portion 8*a* of the first fastening element 6 protruding from the aperture 9*b* of the second electrical conductor 3 in the assembled state.

At this juncture, it should be mentioned that the second fastening element 7, if it is to be screwed onto a primary external thread 17 of the first fastening element 6, does not necessarily have to be designed in the manner of a screw nut arranged completely outside the aperture 9*b* defined in the second electrical conductor 3. The second fastening element 7 can, for example, also be designed in the form of a sleeve, wherein an axial portion of the sleeve-shaped second fastening element 7 can then, for example, also extend into the aperture 9*b* of the second electrical conductor 2 in order to enter into the primary threaded connection 18 to the first fastening element 6 within the aperture 9*b* or on the side of the second electrical conductor 3 facing the first electrical conductor 2. In this respect, the second fastening element 7 can, for example, be constructed similarly to the first fastening element 6 shown in FIGS. 1 and 2. This also applies analogously to the embodiment described below according to FIG. 6.

Figure 5:
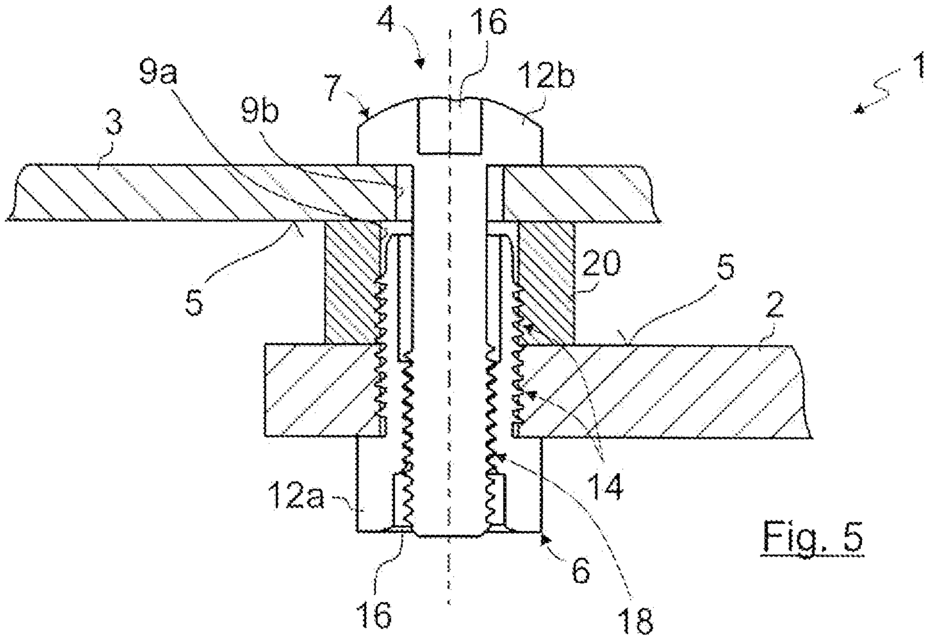
FIG. 5 shows a connection system according to a third exemplary embodiment of the invention in an assembled state, in a sectional side view.
Figure 6:
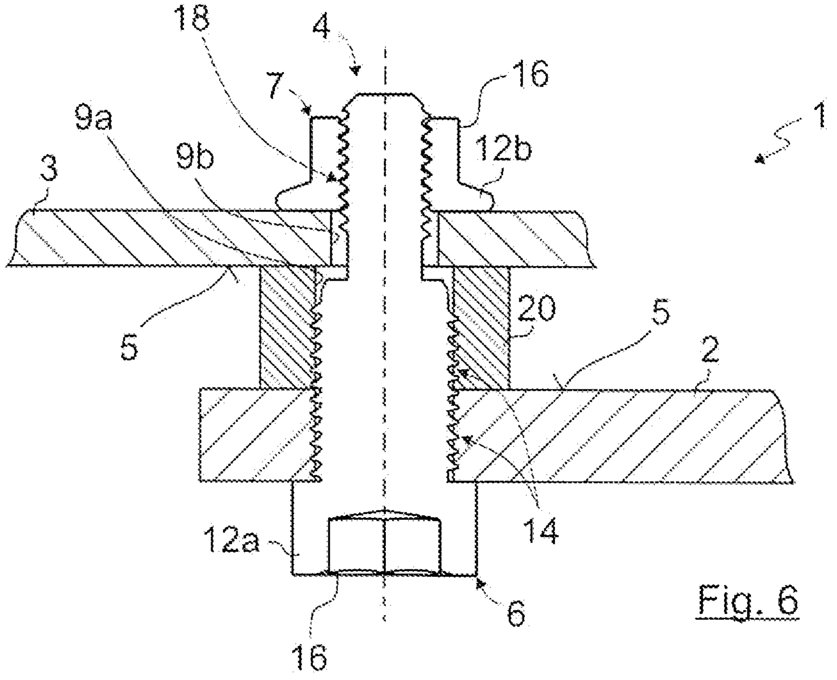
FIG. 6 shows a connection system according to a fourth exemplary embodiment of the invention in an assembled state, in a sectional side view.

FIGS. 5 and 6 illustrate two further embodiments of a fastening system 1 according to the invention. FIG. 5 relates to a sleeve-shaped first fastening element 6 in combination with a screw-shaped second fastening element 7 and FIG. 6 relates to a bolt-shaped first fastening element 6 in combination with a second fastening element 7 designed as a screw nut. In contrast to the previous embodiments, the two electrical conductors 2, 3 are not directly connected to each other via their contact surfaces 5. An additional electrical contact sleeve 20 is arranged between the first electrical conductor 2 and the second electrical conductor 3 in order to establish an indirect electrical and mechanical connection between the electrical conductors 2, 3 when the two fastening elements 6, 7 are in their screwed state.

The use of a contact sleeve 20 can be advantageous for various technical reasons, for example to provide a defined spacing between the electrical conductors 2, 3.

Operation

Having described the structure of our Connection Arrangement, Connection System and Method for Connecting Two Electrical Conductors, its operation is briefly described.

A first electrical conductor (2) is provided and a second electrical conductor (3) is provided. One of the first electrical conductor (2) or the second electrical conductor (3) may be in electrical communication with a source of electrical power (not shown). A first fastening element (6) is provided that has a support surface (11*a*) and a mechanical connection interface (13) for a captive connection to the first electrical conductor (2); and inserting the first fastening element (6) into an aperture (9*a*) defined in the first electrical conductor (2) until the captive connection of the first fastening element (6) to the first electrical conductor (2) is established. A second fastening element (7) is provided that has a support surface (11*b*); and screwing the second fastening element (Z) to the first fastening element (6) via a common primary threaded connection (18) until the support surface (11*b*) of the second fastening element (7) is supported on a side of the second electrical conductor (3) facing away from the first electrical conductor (2), and the first electrical conductor (2) and the second electrical conductor (3), are frictionally and electrically connected.

A principal object of the present invention is a connection arrangement (4) for connecting a first electrical conductor (2) to a second electrical conductor (3) comprising: a first fastening element (6) that can be inserted into an aperture (9*a*) defined in the first electrical conductor (2) and the first fastening element (6) has a support surface (11*a*) with which the first fastening element (6) is supported on a side of the first electrical conductor (2) facing away from the second electrical conductor (3); and a second fastening element (7) which has a support surface (11*b*) with which the second fastening element (7) is supported on a side of the second electrical conductor (3) facing away from the first electrical conductor (2); and wherein the first fastening element (6) and the second fastening element (7), when in a screwed together state, form a common primary threaded connection (18) that connects the first electrical conductor (2) frictionally and electrically to the second electrical conductor (3); and wherein the first fastening element (6) has a mechanical connection interface (13) for a captive connection to the first electrical conductor (2); and the mechanical connection interface (13) of the first fastening element (6) forms a secondary threaded connection (14) to the first electrical conductor (2) for captive connection of the first fastening element (6) within the aperture (9*a*) defined in the first electrical conductor (2).

A further object of the present invention is a connection arrangement (4) wherein the first fastening element (6) is sleeve-shaped and the first fastening element (6) has a primary internal thread (10) for the common primary threaded connection (18) to the second fastening element (7), and wherein the primary internal thread (10) of the first fastening element (6) extends through the first fastening element (6) starting from an end portion of the first fastening element (6) that faces the second fastening element (7): or the first fastening element (6) is bolt-shaped and the first fastening element (6) has a primary external thread (17) for the common primary threaded connection (18) to the second fastening element (7), and wherein the primary external thread (17) of the bolt-shaped first fastening element (6) extends at least partially along an end portion of the first fastening element (6), which protrudes from an aperture (9*b*) defined in the second electrical conductor (3) on a side of the second electrical conductor (3) facing away from the first electrical conductor (2).

A further object of the present invention is a connection arrangement (4) wherein the first fastening element (6) has a shank portion (8*a*) which extends from the support surface (11*a*) of the first fastening element (6) into the aperture (9*a*) defined in the first electrical conductor (2), and the shank portion (8*a*) has the mechanical connection interface (13) for making the captive connection of the first fastening element (6) to the first electrical conductor (2) within the aperture (9*a*) defined in the first electrical conductor (2).

A further object of the present invention is a connection arrangement (4) wherein the mechanical connection interface (13) of the first fastening element (6), does not emerge from the aperture (9*a*) defined in the first electrical conductor (2) on a side of the first electrical conductor (2) facing the second electrical conductor (3) when the support surface (11*a*) of the first fastening element (6) is supported on the first electrical conductor (2).

A further object of the present invention is a connection arrangement (4) wherein directions of rotation of the secondary threaded connection (14) and the primary threaded connection (18) are opposite to each other.

A further object of the present invention is a connection arrangement (4) wherein the mechanical connection interface (13) of the first fastening element (6) has a self-tapping, secondary external thread to cut a corresponding, secondary internal thread (15) into a circumferentially extending edge of the aperture (9*a*) defined in the first electrical conductor (2).

A further object of the present invention is a connection arrangement (4) wherein the first fastening element (6), and the second fastening element (7), each define a mechanical interface (16) for connection to a screwing tool to transmit a torque from the screwing tool to the respective fastening element (6, 7).

A further object of the present invention is a connection arrangement (4) wherein the first fastening element (6), and the second fastening element (7), are each formed from a material that has a higher mechanical strength than the first electrical conductor (2) or a higher mechanical strength than the second electrical conductor (3).

A further object of the present invention is a connection arrangement (4) wherein the second fastening element (7) is a screw which can be guided through an aperture (9*b*) defined in the second electrical conductor (3) and the screw second fastening element (7) can be screwed into the first fastening element (6) when the first fastening element (6) is received in the aperture (9*a*) defined in the first electrical conductor (2); or the second fastening element (7) is designed as a screw nut which can be screwed onto a primary external thread (17) defined by the first fastening element (6) protruding from an aperture (9*b*) defined in the second electrical conductor (3) when the first fastening element (6) is received in the aperture (9*a*) defined in the first electrical conductor (2).

A further object of the present invention is a connection system (1) for high voltage technology, comprising a first electrical conductor (2): a second electrical conductor (3); and a connection arrangement (4) for connecting the first electrical conductor (2) to the second electrical conductor (3), the connection arrangement (4) having, a first fastening element (6) that can be inserted into an aperture (9*a*) defined in the first electrical conductor (2) and the first fastening element (6) has a support surface (11*a*) with which the first fastening element (6) is supported on a side of the first electrical conductor (2) facing away from the second electrical conductor (3); and a second fastening element (7) which has a support surface (11*b*) with which the second fastening element (7) is supported on a side of the second electrical conductor (3) facing away from the first electrical conductor (2); and wherein the first fastening element (6) and the second fastening element (7), when in a screwed together state, form a common primary threaded connection (18) that connects the first electrical conductor (2) frictionally and electrically to the second electrical conductor (3); and wherein the first fastening element (6) has a mechanical connection interface (13) for a captive connection to the first electrical conductor (2); and the mechanical connection interface (13) of the first fastening element (6) forms a secondary threaded connection (14) to the first electrical conductor (2) for captive connection of the first fastening element (6) within the aperture (9*a*) defined in the first electrical conductor (2); and the first fastening element (6) is inserted into the aperture (9*a*) defined in the first electrical conductor (2) and is connected to the second fastening element (7) via the common primary threaded connection (18).

A further object of the present invention is a connection system (1) wherein the aperture (9*a*) defined in the first electrical conductor (2) is arranged coaxially to an aperture (9*b*) defined in the second electrical conductor (3), through which the first fastening element (6) or the second fastening element (7) extends.

A further object of the present invention is a connection system (1) wherein the aperture (9*a*) defined in the first electrical conductor (2) or an aperture (9*b*) defined in the second electrical conductor (3) are formed as a round through-hole.

A further object of the present invention is a connection system (1) further comprising: an electrical contact surface (S) on both the first electrical conductor (2) and on the second electrical conductor (3) and the electrical contact surface (5) is on a side of each respective electrical conductor (2, 3) facing the other electrical conductor (2, 3), and the electrical contact surface (5) provides mutual connection for current transmission; and wherein, the first electrical conductor (2), and the second electrical conductor (3), are each high-voltage contact elements.

A further object of the present invention is a connection system (1) further comprising: an electrical contact sleeve (20) that is arranged between the first electrical conductor (2) and the second electrical conductor (3), and the electrical contact sleeve (2) establishes an indirect electrical and mechanical connection between the first electrical conductor (2) and the second electrical conductor (3) when the first fastening element (6) is connected to the second fastening element (7).

A further object of the present invention is a method for connecting a first electrical conductor (2) to a second electrical conductor (3), comprising the steps: providing a first fastening element (6) that has a support surface (11*a*) and a mechanical connection interface (13) for a captive connection to the first electrical conductor (2); and inserting the first fastening element (6) into an aperture (9*a*) defined in the first electrical conductor (2) until the captive connection of the first fastening element (6) to the first electrical conductor (2) is established: providing a second fastening element (Z) that has a support surface (11*b*); and screwing the second fastening element (7) to the first fastening element (6) via a common primary threaded connection (18) until the support surface (11*b*) of the second fastening element (7) is supported on a side of the second electrical conductor (3) facing away from the first electrical conductor (2), and the first electrical conductor (2) and the second electrical conductor (3), are frictionally and electrically connected.

A further object of the present invention is a connection arrangement (4) wherein the same type of mechanical interface (16) is provided in both the first fastening element (6) and in the second fastening element (7).

A still further object of the present invention is a connection arrangement (4) wherein the first fastening element (6) or the second fastening element (7) is formed of steel.

An even still further object of the present invention is a connection system (1) wherein the first electrical conductor (2,) and the second electrical conductor (3), are each designed as a busbar or as a cable lug.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is therefore, claimed in any of its forms or modifications within the proper scope of the appended claims appropriately interpreted in accordance with the Doctrine of Equivalents.

The invention claimed is:

1. A connection system (1) for electrical contact elements, comprising:

a first electrical conductor (2) which is an electrical contact element;

a second electrical conductor (3) which is an electrical contact element; and a connection arrangement (4) for connecting the first electrical conductor (2) to the second electrical conductor (3), the connection arrangement (4) having, a first fastening element (6) that can be inserted into an aperture (9*a*) defined in the first electrical conductor (2) and the first fastening element (6) has a support surface (11*a*) with which the first fastening element (6) is supported on a side of the first electrical conductor (2) facing away from the second electrical conductor (3); and a second fastening element (7) which has a support surface (11*b*) with which the second fastening element (7) is supported on a side of the second electrical conductor (3) facing away from the first electrical conductor (2); and wherein the first fastening element (6), and the second fastening element (7), are each formed from a material that has a higher mechanical strength than the material forming the first electrical conductor (2) and a higher mechanical strength than the material forming the second electrical conductor (3); and wherein the first fastening element (6) and the second fastening element (7), when in a screwed together state, form a common primary threaded connection (18) that connects the first electrical conductor (2) frictionally and electrically to the second electrical conductor (3); and the first fastening element (6) has a mechanical connection interface (13) for a captive connection to the first electrical conductor (2); and the mechanical connection interface (13) of the first fastening element (6) forms a secondary threaded connection (14) to the first electrical conductor (2) for captive connection of the first fastening element (6) within the aperture (9*a*) defined in the first electrical conductor (2); and the first fastening element (6) is inserted into the aperture (9*a*) defined in the first electrical conductor (2) and is connected to the second fastening element (7) via the common primary threaded connection (18).

2. The connection system (1) as claimed in claim 1 and wherein the aperture (9*a*) defined in the first electrical conductor (2) is arranged coaxially to an aperture (9*b*) defined in the second electrical conductor (3), through which the first fastening element (6) or the second fastening element (7) extends.

3. The connection system (1) as claimed in claim 1 and wherein the aperture (9*a*) defined in the first electrical conductor (2) or an aperture (9*b*) defined in the second electrical conductor (3) are formed as a round through-hole.

4. The connection system (1) as claimed in claim 1 and further comprising:

an electrical contact sleeve (20) that is arranged between the first electrical conductor (2) and the second electrical conductor (3), and the electrical contact sleeve (2) establishes an indirect electrical and mechanical connection between the first electrical conductor (2) and the second electrical conductor (3) when the first fastening element (6) is connected to the second fastening element (7).

5. The connection system (1) as claimed in claim 1 and further comprising:

an electrical contact surface (5) on both the first electrical conductor (2) and on the second electrical conductor (3) and the electrical contact surface (5) is on a side of each respective electrical conductor (2, 3) facing the other electrical conductor (2, 3), and the electrical contact surface (5) provides mutual connection for current transmission.

6. The connection system (1) as claimed in claim 5 and wherein the first electrical conductor (2,) and the second electrical conductor (3), are each designed as a busbar or as a cable lug.

7. A method for connecting a first electrical contact element (2) to a second electrical contact element (3), comprising the steps:

providing a first fastening element (6) that has a support surface (11*a*) and a mechanical connection interface (13) for a captive connection to the first electrical contact element (2), and the first fastening element (6) is formed of a material that has a higher mechanical strength than the material forming the first electrical contact element (2); and inserting the first fastening element (6) into an aperture (9*a*) defined in the first electrical contact element (2) until the captive connection of the first fastening element (6) to the first electrical contact element (2) is established;

providing a second fastening element (7) that has a support surface (11*b*), and the second fastening element (7) is formed of a material that has a higher mechanical strength than the material forming the second electrical contact element (3); and screwing the second fastening element (7) to the first fastening element (6) via a common primary threaded connection (18) until the support surface (11*b*) of the second fastening element (7) is supported on a side of the second electrical contact element (3) facing away from the first electrical contact element (2), and the first electrical contact element (2) and the second electrical contact element (3), are frictionally and electrically connected; and wherein the mechanical connection interface (13) of the first fastening element (6) forms a secondary threaded connection (14) to the first electrical contact element (2) for captive connection of the first fastening element (6) within the aperture (9*a*) defined in the first electrical contact element (2).

* * * * *